Nov. 8, 1938.  E. C. HEAD  2,135,894
MACHINE FOR FORMING SPIRAL BEVEL GEAR CUTTERS
Filed March 6, 1936  8 Sheets-Sheet 3

FIG. 3.

INVENTOR
ERNEST C. HEAD
BY *Whittemore Hulbert*
*Whittemore & Belknap*
ATTORNEYS Nov. 8, 1938.  E. C. HEAD  2,135,894
MACHINE FOR FORMING SPIRAL BEVEL GEAR CUTTERS
Filed March 6, 1936   8 Sheets-Sheet 4

INVENTOR
ERNEST C. HEAD
BY Whittemore Hulbert
Whittemore & Belknap
ATTORNEYS

Nov. 8, 1938. E. C. HEAD 2,135,894
MACHINE FOR FORMING SPIRAL BEVEL GEAR CUTTERS
Filed March 6, 1936 8 Sheets-Sheet 5

INVENTOR
ERNEST C. HEAD
BY Whittemore Hulbert
Whittemore & Belknap
ATTORNEYS

Nov. 8, 1938.  E. C. HEAD  2,135,894
MACHINE FOR FORMING SPIRAL BEVEL GEAR CUTTERS
Filed March 6, 1936  8 Sheets-Sheet 6

INVENTOR
ERNEST C. HEAD
BY Whittemore Hulbert
Whittemore & Belknap
ATTORNEYS

Nov. 8, 1938.   E. C. HEAD   2,135,894
MACHINE FOR FORMING SPIRAL BEVEL GEAR CUTTERS
Filed March 6, 1936   8 Sheets-Sheet 7

INVENTOR
ERNEST C. HEAD
BY Whittemore Hulbert
Whittemore & Belknap
ATTORNEYS

Nov. 8, 1938.  E. C. HEAD  2,135,894
MACHINE FOR FORMING SPIRAL BEVEL GEAR CUTTERS
Filed March 6, 1936  8 Sheets-Sheet 8

INVENTOR
ERNEST C. HEAD
BY Whittemore Hulbert
Whittemore & Belknap
ATTORNEYS

Patented Nov. 8, 1938

2,135,894

UNITED STATES PATENT OFFICE 2,135,894

MACHINE FOR FORMING SPIRAL BEVEL GEAR CUTTERS

Ernest C. Head, Detroit, Mich., assignor of one-half to Goddard & Goddard Company, Inc., Detroit, Mich., a corporation of Michigan Application March 6, 1936, Serial No. 67,542

14 Claims. (Cl. 51—33)

The invention relates to a machine for grinding cutter blades and more particularly to a machine for grinding the side faces of finishing cutter blades which are used in a face mill cutter for generating spiral bevel gears and pinions.

The invention relates also to a method of finish grinding the cutter blades whereby all portions of the blade back of the cutting edge are so formed that when the blade is resharpened, the new cutting edge remains a straight line having the correct pressure angle.

The invention further relates to a new type of cutter blade, particularly a finishing blade, having characteristics which are different from those previously used in the cutting of spiral bevel gears. This new blade may be made by the new method and on the machine hereinafter more fully described.

The present application has to do primarily with the novel machine, but it is to be understood that the novel method and the novel cutter blade are also part of my invention, and the right to claim all of the novel subject matter disclosed in this or in co-pending applications is hereby reserved.

The main object of the invention is to make a cutter blade which is more accurate than the blades heretofore produced.

Another object is to provide a method for making a finishing cutter blade in which the grinding of the side edges and the top edge may be done in a single head.

One of the important objects of the invention is to provide a machine which will form the side faces of a finishing cutter blade in such a manner that the blade will have a straight cutting edge and a constant pressure angle from the front to the back so that its cutting action is the same after each resharpening.

Another object of the invention is to provide a machine for rotating a cutter spindle in timed relation to an oscillatory movement of a grinder wheel about a center in predetermined relation to the blades on the cutter spindle whereby the surface of the cutter blades is relieved back of the cutting edge in the desired manner.

A further object is to correlate the various elements of the machine to permit adjustment of the cutter spindle into predetermined geometrical relation to the grinder wheel so that both inside and outside cutter blades may be finished in the same machine.

Another object is to provide a method and machine for correcting inaccuracies in cutter blades which have been formed by other methods.

In order to understand the invention more readily, it is believed desirable to first describe one construction of machine embodying the invention and to this end reference should be made to the accompanying drawings, in which.

The illustrated machine comprises generally a base or frame 25 on which are mounted the cutter carrying mechanism generally indicated as 26 and the grinder carrying mechanism 27. The cutter carrying mechanism 26 comprises generally the horizontal carriage 28 reciprocable from front to back of the machine on which is the angularly adjustable vertical column 31 movable about the vertical axis 30. A saddle 31a is angularly adjustable on the column 31 about a point 29 which represents the center of the machine, to permit varying the inclination in a vertical plane of the spindle housing 32. The spindle housing 32 is adjustably mounted on the saddle 31a, the adjustment being in an axial direction with the spindle. The rotatable spindle in the housing has mounted thereon the dummy head 33 in which the cutter blades 34 are inserted. The spindle has its other end connected by a train of gearing hereinafter more fully described to a gear box 35 which derives its power from the electric motor 36 on the left side of the base of the machine.

The grinder carrying mechanism 27 comprises a horizontal carriage 37 movable transversely to the carriage 28, that is, from side to side as viewed from the front of the machine. Carried by the carriage is the swivel 39 adapted to oscillate in a horizontal plane about the pivot point 40 of the carriage which is the point with respect to which all of the various mechanisms of the machine must be adjusted in order to properly set the machine for the work to be performed. On the swivel is the grinder head slide 41 carrying the saddle 42 which in turn carries the electric motor 43. The shaft of the motor projects outwardly therefrom and has secured thereto the cylindrical grinder wheel 44, the plane of which is generally transverse to the machine and may be adjusted into substantial alignment with the pivot point 40. The rotation of the grinder wheel is independent of the other movements of the machine and is predetermined to give proper grinding action. The oscillatory motion of the swivel 39 is controlled by a cam 207A rotating about a vertical axis and deriving its power from a train of gearing connecting the same to the gear box 35 and thence to the motor 36. The cam 207A cooperates with a cam follower hereafter more fully described so constructed and arranged to cause the swivel 39 to move slowly about the pivot 40 in a counterclockwise direction for a predetermined movement and then to rapidly return to its initial position. This causes a rocking movement of the grinder wheel 44 with respect to the blade 34 as the blade is moving through its orbit on the cutter head. There is a timed relation between the rotation of the cutter head and the oscillation of the swivel such that one complete oscillating movement is effected during the time that the cutter blade travels in its orbit the distance from one blade to the next blade. The timing is such that while the cutter blade passes the grinding wheel, the swivel is slowly moved in a counterclockwise direction. When the contact between the wheel and the blade is completed and before the wheel contacts the next successive blade, the swivel is rapidly moved in a clockwise direction to its intial position. Consequently the grinder wheel changes its angular relation to the cutter blade continuously as it advances from the leading cutting edge toward the trailing edge of the blade.

The general relationship of the elements of the machine has been given above, and I will now describe more in detail the various parts of the machine.

*Mechanism for adjusting the cutter head*

Figures 4, 5, 6, 7, 8:
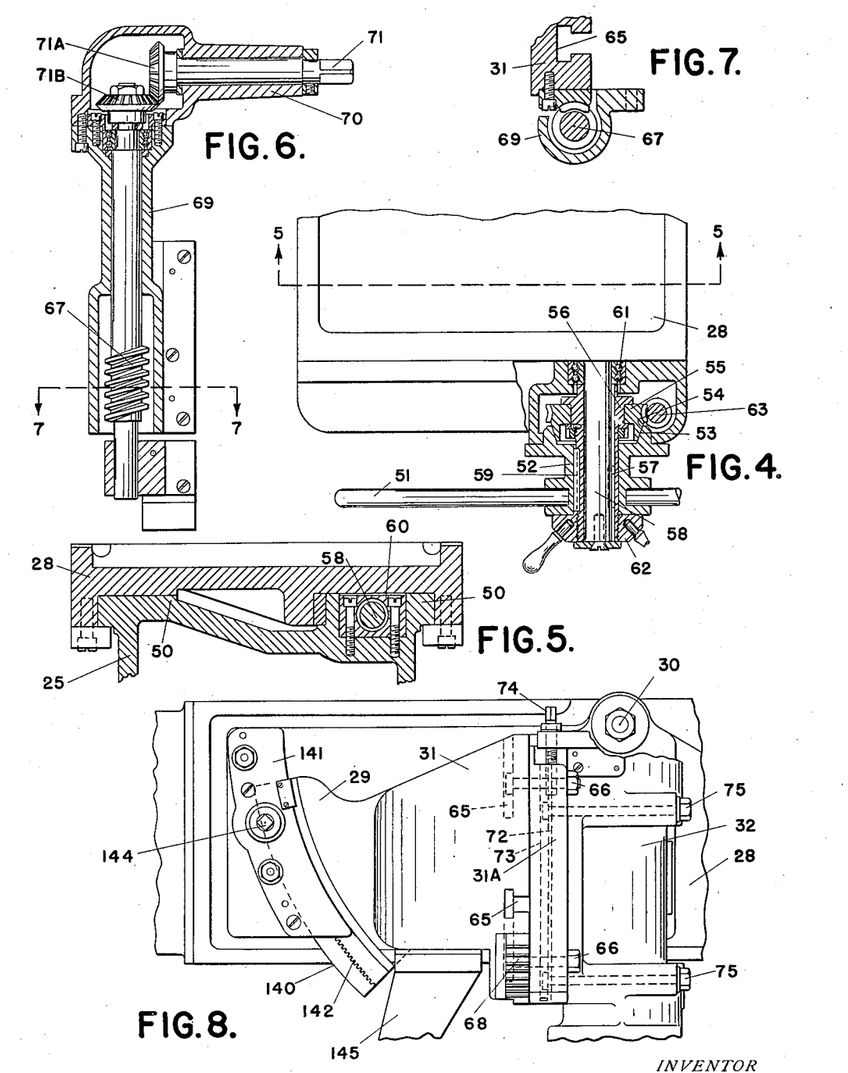
Figure 4 is a fragmentary plan view of a portion of the carriage for the cutter spindle showing the feeding mechanism.
Figure 5 is a transverse section on the line 5—5 of Figure 4.
Figure 6 is a section on the line 6—6 of Figure 3 showing the adjusting mechanism for raising and lowering the cutter spindle.
Figure 7 is a cross section on the line 7—7 of Figure 6.
Figure 8 is an enlarged fragmentary plan view showing the adjustment of the cutter spindle about a vertical axis.
Figures 9, 10:
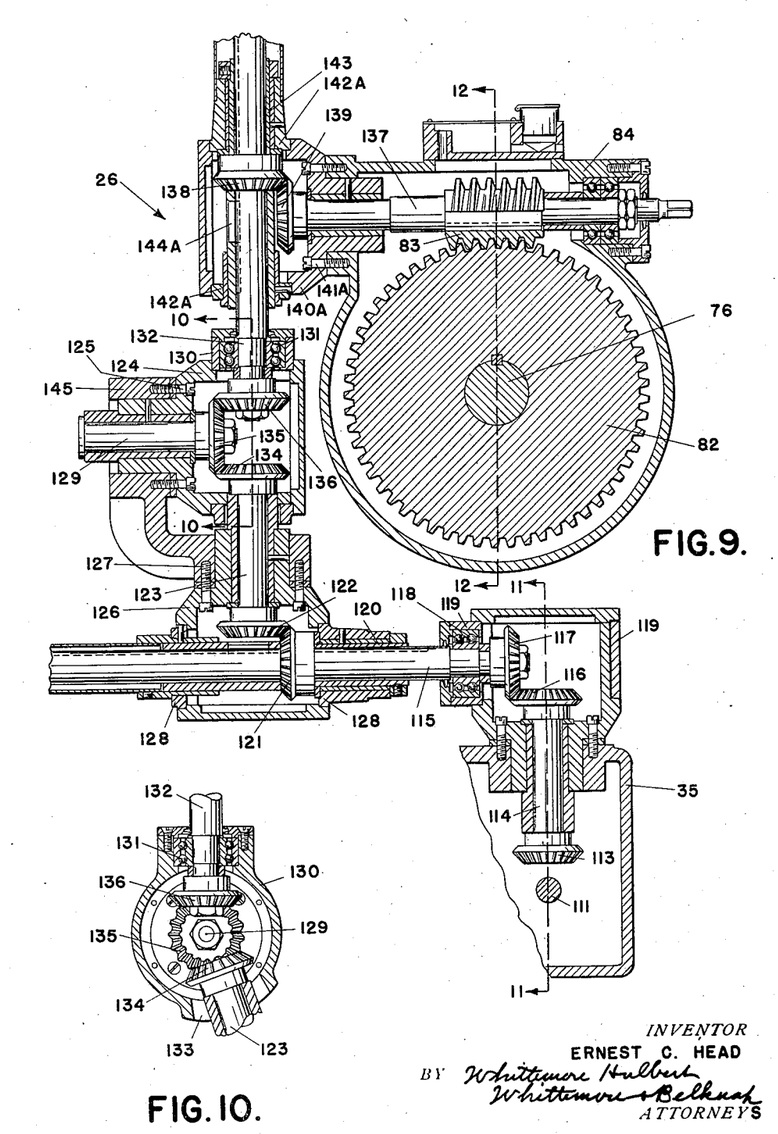
Figure 9 is a transverse section through certain portions of the driving mechanism of the machine.
Figure 10 is a cross section on the line 10—10 of Figure 9.
Figure 11:
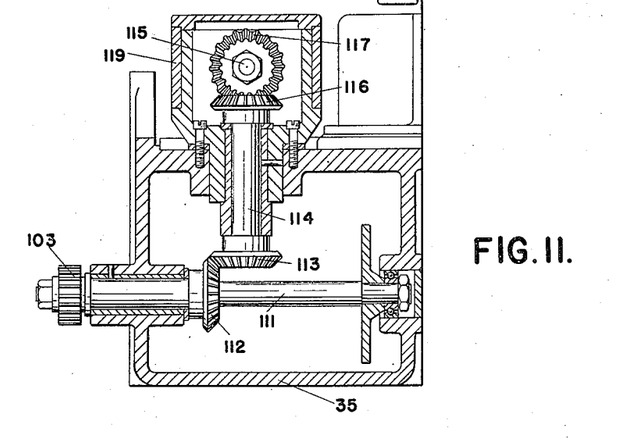
Figure 11 is a vertical section on the line 11—11 of Figure 9.
Figure 12:
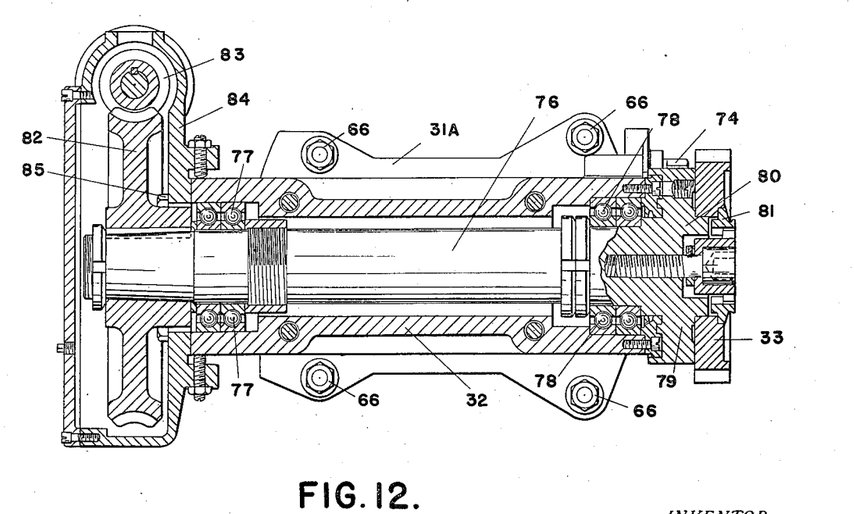
Figure 12 is a longitudinal section through the cutter spindle on the line 12—12 of Figure 9.
Figure 13:
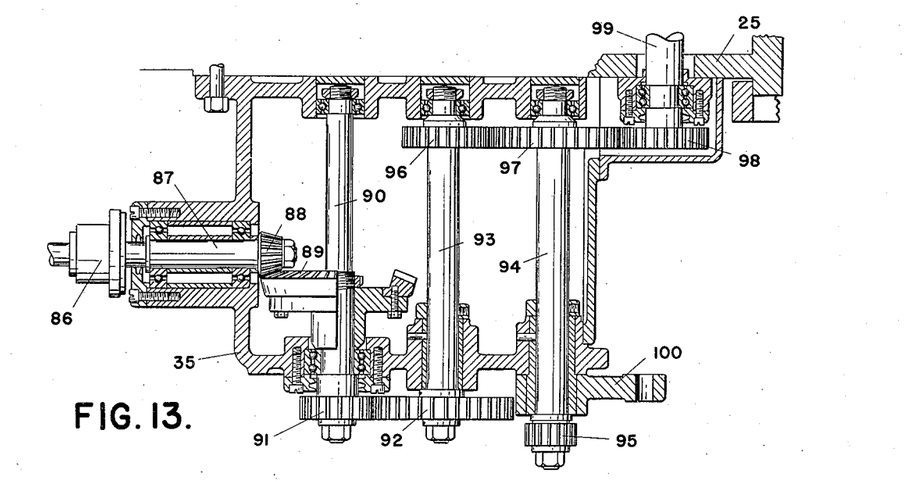
Figure 13 is a section through the gear box substantially on the line 13—13 of Figure 2.
Figure 14:
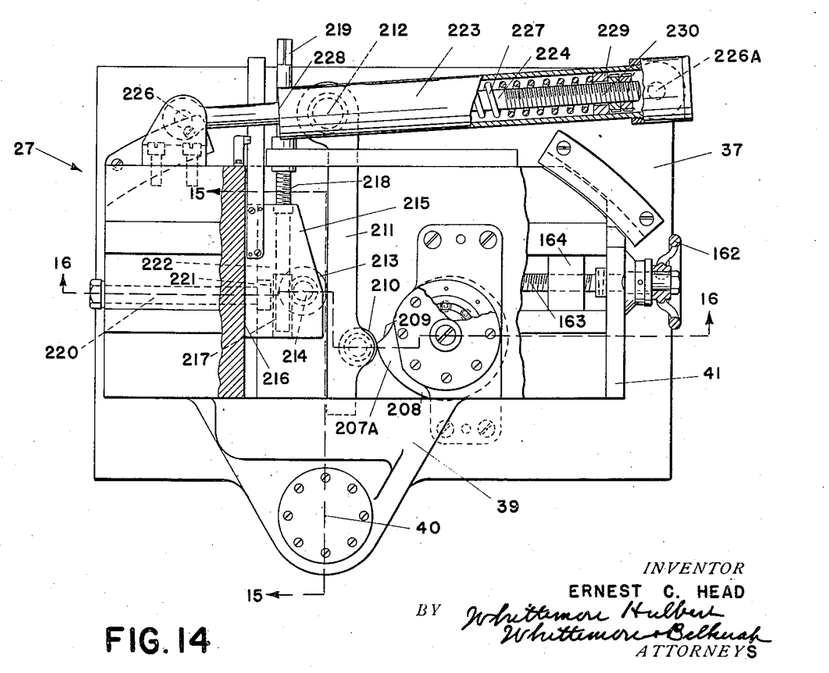
Figure 14 is a plan view partly in section of the swivel mechanism.
Figure 15:
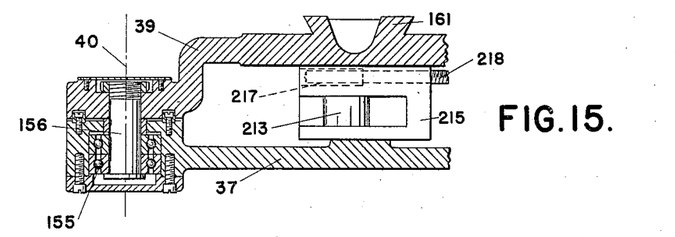
Figure 15 is a front sectional elevation on the line 15—15 of Figure 14.
Figure 16:
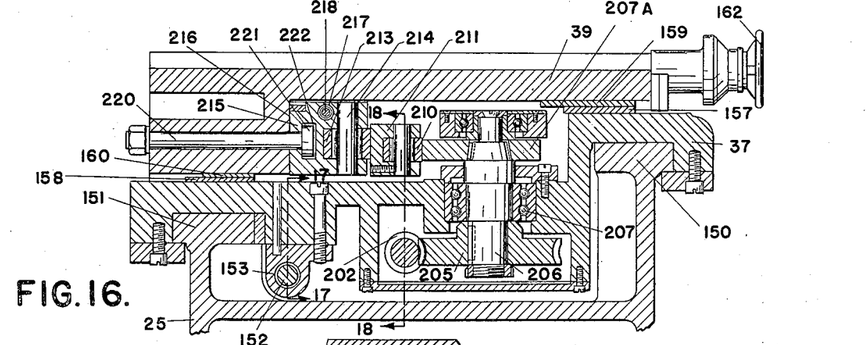
Figure 16 is a cross section on the line 16—16 of Figure 14.
Figure 17:
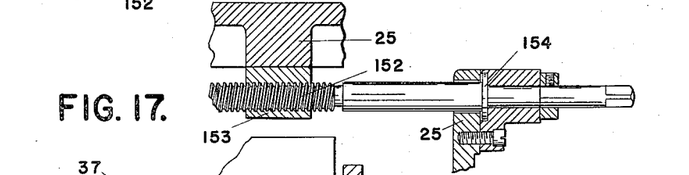
Figure 17 is a section on the line 17—17 of Figure 16 illustrating the adjusting mechanism for the grinder head slide.
Figure 18:
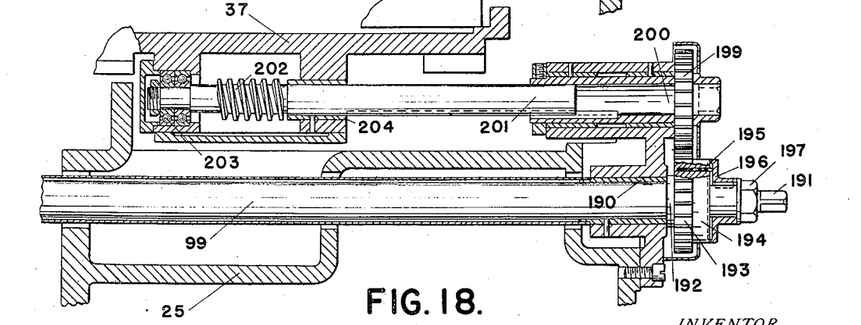
Figure 18 is a front sectional elevation showing the driving mechanism for the oscillating swivel taken on the line 18—18 of Figure 16.

As previously described, the horizontal carriage 28 is arranged on the base 25 of the machine to reciprocate from the front to the back of the machine. As shown in Figure 5, the carriage slides upon the ways 50. For adjusting the carriage there is provided the capstan handle 51, the hub 52 of which has a conical face 53 adjacent the conical face 54 of the worm wheel 55. The worm wheel is freely rotatable upon a sleeve 56 which sleeve is keyed at 57 to the adjusting screw 58. The sleeve 56 is also keyed at 59 to the hub 52. The screw 58 engages a nut 60 fixedly attached to the frame 25 and is mounted for free rotation in the carriage 28 by the ball bearing 61. Thus by rotation of the capstan handle 51, the carriage may be rapidly moved to the desired position on the frame. In order to provide a fine adjustment for feeding the carriage there is threaded on the outer end of the sleeve 56 a locking nut 62 which when tightened on the sleeve bears against the hub 52 and forces the conical face 53 against the conical face 54, thus locking the worm wheel to the hub 52. The fine adjustment of the carriage is then obtained through the worm 63, the shaft of which is provided with a suitable handwheel 64.

The angularly adjustable vertical column 31 is movable about the vertical axis 30. At the back edge of the column 31 is an arcuate bearing surface 140 which is guided in the block 141 on the rear end of the carriage 28. For adjusting the vertical column 31 the latter has gear teeth 142 engaging a pinion journaled in the block 141. A squared shaft 144 projects upwardly from the pinion for receiving a suitable adjusting handle. The vertical column 31 is provided with arcuate T slots 65 in which clamping bolts 66 are arranged to clamp the saddle 31a in adjusted position. For angularly adjusting the saddle there is a worm 67, the teeth of which engage the gear teeth 68 on the column 31. The worm is carried in a housing 69 secured to the saddle. The housing has an angularly extending portion 70 from which the square shank 71 projects for receiving a suitable adjusting handle. The shank 71 is connected by bevel gears 71A and 71B within the housing 69 to the worm 67. The spindle housing 32 has guiding portions 72 engaging ways 73 in the saddle permitting an axial adjustment of the spindle housing with respect to the saddle. This adjustment is accomplished by means of the adjusting screw 74 and the housing is secured in adjusted position by the clamping nuts 75. The cutter spindle 76 is mounted within the housing on ball bearings 77 and 78 and has at its forward end the enlarged head 79. The head has a central hub 80 for receiving the dummy head 33 which may be clamped thereto by quick change collet 81. At the opposite end of the cutter spindle 76 there is keyed a worm wheel 82 engaging a worm 83. A housing 84 for the worm wheel mechanism is secured to the spindle housing 32 by suitable bolts 85.

*Driving mechanism for cutter spindle*

The driving mechanism for the machine is obtained from the electric motor 36 on the left side of the base of the machine. This motor through a coupling 86 is connected to the shaft 87 in the gear box 35. The shaft has within the gear box the bevel gear 88 which meshes with bevel gear 89 on the shaft 90. The shaft is supported at its opposite ends by bearings on the side walls of the gear box and has its forward end extending through the gear box for receiving the gear 91 on the outside of the box. Gear 91 meshes with gear 92 carried by a second shaft 93. Gears 91 and 92 are speed change gears for changing the speed of the entire machine. A third shaft 94 extends parallel to the shaft 93. The shafts 93 and 94 are connected within the gear box by the gears 96 and 97. The gear 97 also meshes with gear 98 which is carried at the end of a cross shaft 99 extending through the frame to the right side of the machine. This cross shaft forms the driving mechanism for the grinder wheel mechanism hereinafter described.

The shaft 94 forms the driving mechanism for the cutter spindle and since both shafts 99 and 94 derive their motion from the gear 97, it is evident that the two portions of the machine are driven in a timed relationship. The shaft 94 projects through the gear box and carries at its outer end the gear 95. It also has rotatably mounted thereon a tumbler 100. The tumbler 100 carries on the arm 101 the gear 102 which is adapted to mesh with the gears 95 and 103 when the cutter spindle is to be rotated in one direction. The tumbler also carries on the arm 104 the meshing gears 105 and 106 for connecting the gears 95 and 103 when reversal of the cutter spindle is desired. The tumbler has the arcuate slots 107 and 108 for receiving the clamping bolts 109 and locking nuts 110 are provided for securing the tumbler to the gear box when the gears are properly meshed. The tumbler gear mechanism in addition to changing the direction of rotation also provides a means for changing the timed relationship between the cutter spindle and the oscillating mechanism of the grinding wheel. Gear 103 can be changed for gears of different numbers of teeth to enable the proper timing between the oscillating mechanism of the grinding wheel with the number of blades in the dummy cutter head being used. The gear 103 on the outside of the gear box is on a shaft 111 which carries inside the box a bevel gear 112 meshing with the bevel gear 113 on the vertical shaft 114. This shaft projects through the top of the gear box and is connected to a horizontal splined shaft 115 by the bevel gears 116 and 117. The splined shaft must be capable of movement in the horizontal plane in order to permit adjustment of the cutter spindle and as shown, the shaft is supported in a bearing 118 in rotatable member 119 mounted for adjustment about the axis of the vertical shaft 114. Slidably keyed on the splined shaft is the sleeve 120 connected to the bevel gear 121 which meshes with the bevel gear 122 on the vertical shaft 123. For supporting the free end of the splined shaft 115 and the gear train driven thereby, the following structure is used. An arm 145 secured to the column 31 projects over the left side of the machine and forms the support for the gear housings. A cylindrical housing 124 extends in a horizontal direction from the bracket 145 and is secured thereto by screws 125. A cylindrical housing 126 is secured to the arm 145 by the screws 127 and depends therefrom about the vertical axis of the shaft 123. The housing 126 is provided with a member 128 rotatably adjustable about the axis of the shaft 123. This member forms the support for the sleeve 120 and permits the angular adjustment necessary between the horizontal splined shaft 115 and the vertical shaft 123. The cylindrical housing 124 supports a stub shaft 129 rotatable about a horizontal axis. The housing is provided with a member 130 rotatably adjustable about the horizontal axis of the stub shaft 129. The rotatable member has a bearing 131 for the shaft 132 which extends upwardly at an inclination with the vertical shaft 123. The rotatable member 130 has an opening 133 of enlarged width through which the vertical shaft 123 projects. The size of this opening is sufficient to accommodate the necessary angular adjustment between the shafts 123 and 132. The shafts are connected by means of the bevel gear 134 on the shaft 123 which meshes with bevel gear 135 on stub shaft 129 and this in turn meshes with bevel gear 136 on inclined shaft 132. The shaft 132 is splined similarly to the shaft 115 and is drivingly connected to a worm shaft 137 by means of bevel gears 138 and 139. The housing 84 for the worm 83 has a cylindrical housing 140A connected thereto by bolts 141A and the housing has a rotatably adjustable member 142A mounted thereon for rotation about the axis of the shaft 137. The rotatable member forms the support for a sleeve 143 on which the bevel gear 138 is mounted. The sleeve is drivingly connected to the splined shaft 132 by a key 144A. The splined shaft 132 is therefore axially adjustable with respect to the sleeve and is also angularly adjustable with respect to worm shaft 137. The preceding description shows the mechanism whereby the electric motor 36 is caused to drive the dummy head on the cutter spindle 76.

*Grinding wheel mechanism*

The horizontal carriage 37 is reciprocable on the base 25 from side to side as viewed from the front of the machine on the ways 150 and 151. For adjusting the carriage there is an adjusting screw 152 engaging a nut 153 secured to the carriage. The screw has a flange 154 engaging the fixed portion of the frame and has a square shank projecting from the right side of the machine to be engaged by a suitable handle.

At the left side of the carriage 37, a ball bearing 155 is placed in which there is a swivel pin 156 adapted to oscillate in the bearing about the vertical axis or pivot point 40. The pin is secured to and depends from the swiveling member or swivel 39. The bearing between the swivel and carriage is provided by the bearing plates 157, 158 on the carriage above the ways 150, 151 and the cooperating plates 159, 160 on the under side of the swivel. The upper surface of the swivel has the dovetail ways 161 extending from front to back for adjustably mounting the grinder head slide 41. This adjustment is made by handwheel 162 on the screw 163 rotatably mounted in the swivel and engaging the nut 164 on the head slide. Mounted on the head slide 41 is a saddle 42 movable transversely to the head slide, or in other words from side to side of the machine. The head slide is guided in this movement by the depending guide 165 which engages corresponding ways 166 in the head slide. The saddle is clamped in its adjusted position by clamping bolts 167. The saddle is formed integral with the cylindrical housing 168 for the electric motor 43 and the motor shaft 169 is adapted to have mounted thereon the cylindrical grinding wheel 44.

Figure 3:
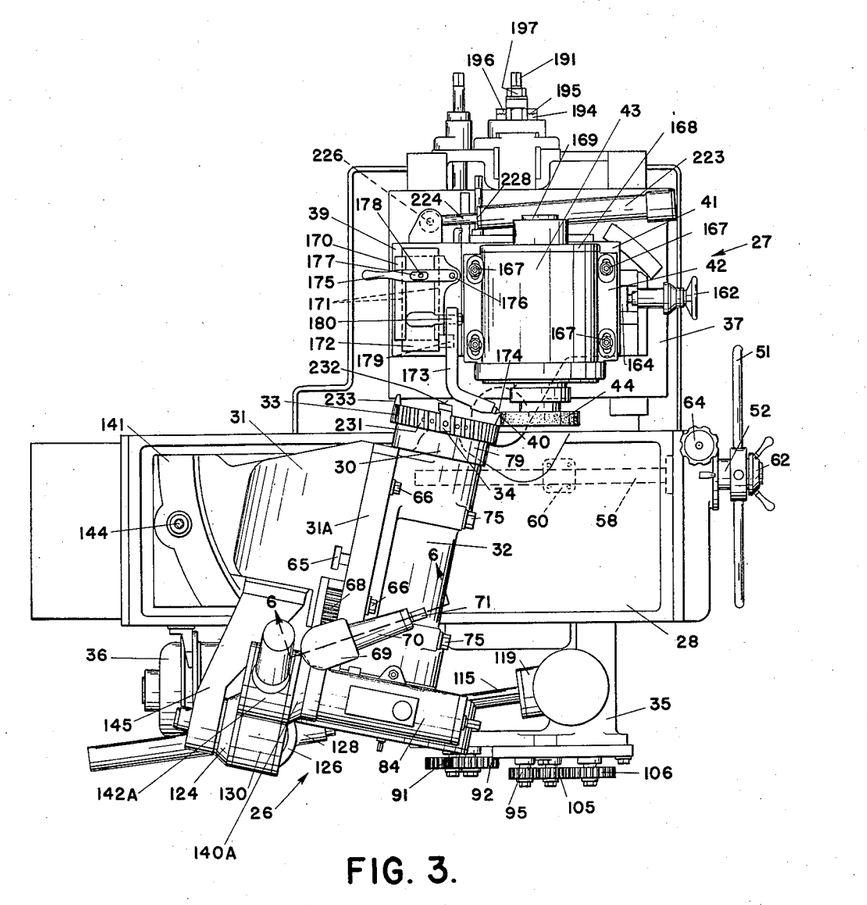
Figure 3 is a plan view.

In order that the grinding wheel may have a true straight edge in cross section, a suitable wheel dressing mechanism is provided and this is illustrated in Figure 3. Bracket 170 extends upward from the swivel 39 and is provided with guideways 171 parallel with the grinding spindle axis. Slidably mounted in the guideways 171 is a slide 172 and pivotally mounted on the slide is an arm 173 carrying the diamond point 174. A lever 175 having a fulcrum 176 in the bracket 170 is provided with an elongated slot 177 engaging a pin 178 in the slide. The arm 173 rests upon a stop 179 which is so arranged that the diamond point 174 is in a horizontal plane through the axis of the grinding wheel, and moves in a plane parallel to the axis of the grinder wheel. The diamond point is positioned so that it passes through the pivotal axis 40 of the swivel. The arm 173 may be swung about its pivot 180 when not in use. In dressing the grinder wheel, it may be fed toward the diamond point by the hand wheel 162.

The dressing mechanism above described is shown in a simplified form for convenience in illustration, but it is to be understood that any other suitable type of dressing mechanism may be employed which will serve to accurately dress the grinding wheel with a straight line edge. Instead of manually operating the dresser as indicated, a suitable power-driven mechanism may be employed so designed as to cause the diamond point to traverse its path at a speed determined in accordance with good practice.

*Driving mechanism for oscillating swivel*

The cross shaft 99 of the machine has previously been described as deriving its rotation from the gear box 35. This cross shaft extends to the right side of the machine and is journaled in a bearing 190 in the fixed frame or base of the machine. The cross shaft has at its outer end a squared shank 191 which may be used for manually adjusting the machine when necessary. It also has a bearing 192 on which is loosely mounted the gear 193. This gear has a laterally extending portion 194, on the face of which clutch teeth 195 are formed. A clutch member 196 has corresponding teeth meshing with the clutch teeth 195 and is keyed to the outer end of the cross shaft. The clutch 196 is clamped on the cross shaft by the clamping nut 197 threadedly engaging the screw threads on the shaft, this arrangement is such that by backing off the nut 197, the clutch 196 is freed from engagement with the clutch teeth 195 and may be angularly adjusted with respect thereto to change the timing between the cross shaft and the gear 193. The gear 193 meshes with gear 199 on a sleeve 200 journaled in the fixed frame of the machine. The sleeve is splined for engagement with the splined shaft 201 which is carried by and projects from the carriage 37. A worm 202 is formed on the shaft 201 between bearings 203 and 204 in the carriage. This worm 202 meshes with the worm wheel 205 on the vertical shaft 206 which is journaled in the carriage by bearings 207. At the upper end of the vertical shaft 206, but beneath the swivel 39, is a cam 207A. The cam has a gradually rising portion 208 on the periphery thereof and an abruptly descending portion 209. The cam bears against a roller 210 on a lever 211 fulcrumed on a pin 212 in the carriage 37. The swivel 39 carries a roller 213 bearing against the side of the lever 211 and adjustable with respect to the fulcrum of the lever to vary the amplitude of the oscillation of the swivel about the swivel axis 40. For obtaining this adjustment, the roller 213 is on a pin 214 in the block 215 which slides on the face 216 of the swivel. The block has a threaded bore 217 for receiving the adjusting screw 218. The latter is rotatable in the swivel and projects outwardly therefrom to form the square shank 219 for an adjusting handle. A clamping bolt 220 extends through the swivel transversely to the adjusting screw and has its headed end 221 engaging in the T-slot 222, thereby clamping the block to the swivel.

From the above, it will be apparent that the cam 207A imparts an oscillating movement to the swivel about the axis 40, and in order to provide a quick return of the swivel when the roller rides down the abrupt face 209 of the cam, a spring device is used. This comprises a sleeve 223 and a rod 224 slidable therein. The rod is pivotally attached to the swivel by the pin 226, while the sleeve is pivotally connected to the carriage 37 by a pin 226A. A spring 227 surrounds the rod within the sleeve and has one end bearing against the abutment 228 on the sleeve and the other end bearing against the adjustable abutment 229 on the threaded outer end 230 of the rod. Thus, as the swivel is oscillated by the cam, the rod is pulled outwardly of the sleeve against the compression of the spring, and as soon as the high point of the cam is passed, the spring returns the swivel to its original position.

*Operation of the machine*

The operation of the machine will best be understood by first describing the method of setting the machine to grind the side cutting faces of a gear cutter blade such as is described in my co-pending application, Serial Number 67,541. Since Figure 3 of the drawings shows a plan view of a machine with the various parts set to grind the cutting surface of an outside cutting blade, the method of setting up the machine for this purpose will first be described.

The dummy head 33 has on its periphery a plurality of slots 231, which, however, instead of extending parallel to the axis of the head as in the finishing cutter, are inclined with respect to the axis at an angle equal to the top clearance angle of the blade. Thus, the top edges 232 of the blades are in a plane perpendicular to the axis of the dummy head and may readily be ground by a surface grinder. The outside surface 233 of the blade is inclined with respect to the axis of the spindle 32 by the amount equal to the pressure angle of the blade. It will be seen from Figure 3 that the cutter spindle 32 may be inclined so that the cylindrical surface of the grinder wheel contacts along the outside surface 233 of the blade from front to back.

As previously mentioned, the vertical axis 40 about which the swivel 39 turns is the center with respect to which the various parts of the machine must be adjusted in order to grind the cutter blades in accordance with my invention. The diamond point 174 is set to be exactly on this axis 40 and by means of the dressing mechanism hereinbefore described, the point may be reciprocated in a plane through the axis 40 parallel to the axis of the grinder wheel. By advancing the grinder head slide 41 by means of the hand wheel 162, the grinder wheel may be fed sufficiently toward the diamond point so that the surface of the wheel is a true cylindrical surface having straight line elements which are exactly on the axis 40. The grinder wheel may be adjusted axially by loosening the bolts 167 and adjusting the saddle in order to adjust for the depth of different cutter blades. Since the swivel 39 is mounted on the carriage 37, when the latter is adjusted transversely of the machine, the relation of the grinder wheel to the pivot axis 40 is unchanged. This adjustment is therefore used to change the relationship of the axis 40 with respect to the cutter spindle and dummy head. The cutter spindle 32 is angularly adjusted in a horizontal plane to the pressure angle of the blade by means of the adjustable vertical column 31. The angular adjustment of the cutter spindle in a vertical plane is accomplished by swinging the cutter spindle in its arcuate T-slot 65 on the vertical column 31. The angle of the cutter axis with the grinder wheel axis must be accurately predetermined in order to obtain a substantially straight line cutting edge in the blades. The method by which this angle may be computed is fully set forth in my co-pending application above referred to. When the cutter spindle has been angularly adjusted in both vertical and horizontal planes in accordance with the desired relationship, it is also necessary to axially adjust the dummy head to a predetermined relationship with center 29, and this is accomplished by loosening the clamping nuts 75 and turning the adjusting screw 74. The carriage 37 is adjusted by means of screw 152 to bring the pivot center 40 to a predetermined relationship with center 30. When the aforesaid adjustments have been properly made, the cutter blade will be in its proper relationship with the grinding wheel. When the machine is adjusted as described, the dummy head may be moved away from the grinder wheel by the capstan handle which moves the carriage 28 from front to back of the machine. The machine may then be set in operation by starting the motor 43 for the grinding wheel and also starting the driving motor 36. As previously described, the motor 36 rotates the cutter spindle and dummy head and also imparts a swinging movement to the swivel 39 about the axis 40. These two motions are in timed relation, and the timing may be predetermined by the proper selection of gear 103 on shaft 111. This timing is such that as the dummy head advances from one cutter blade to the next cutter blade, the cam for the swivel makes one complete revolution and one complete oscillation of the swivel. The amplitude of the swinging movement of the swivel may be adjusted by adjusting screw 218 to a predetermined amount. This amount is computed so that as the cutting blade traverses the grinding wheel from front to back, the necessary angular correction is made so that when said cutter blade is in the cutter head in which it is to be used, there is a constant pressure angle from front to back.

When the machine has been adjusted as above described, the carriage 28 is moved by the capstan handle to bring the surfaces of the cutter blades in approximate contact with the cylindrical surface of the grinder wheel, and the feeding movement of the cutter blades toward the grinding wheel may be continued by tightening the locking nut 62 and continuing the feed with the hand wheel 64.

Figure 1:
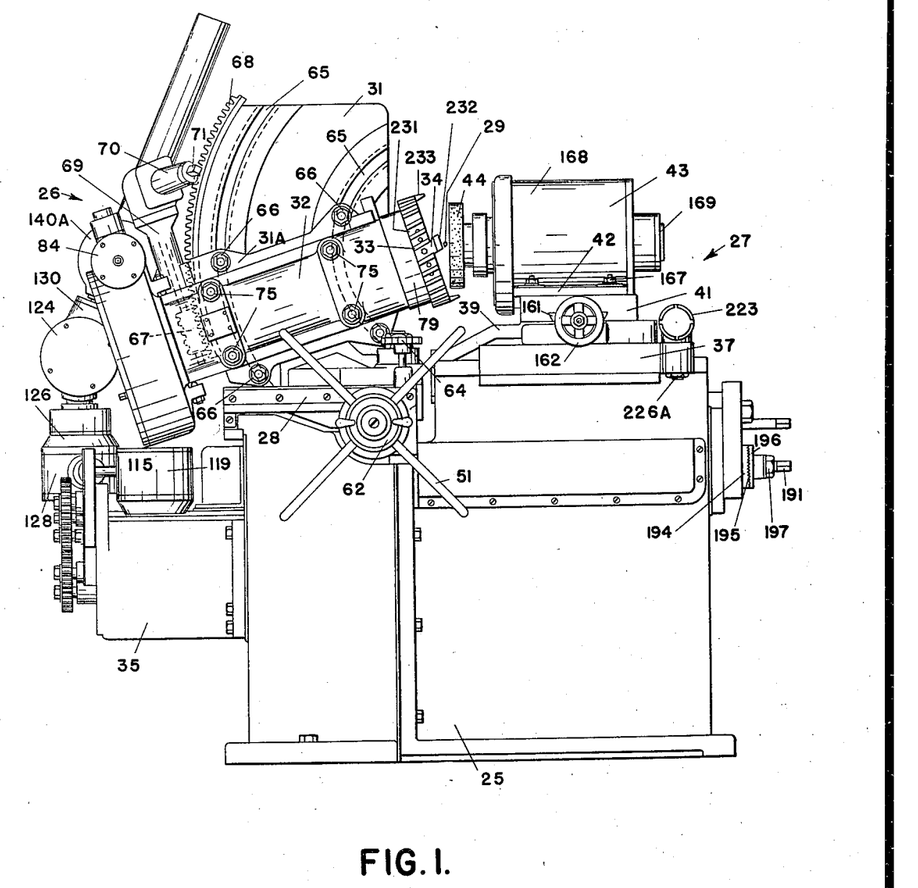
Figure 1 is a front elevation of a machine embodying the invention.
Figure 2:
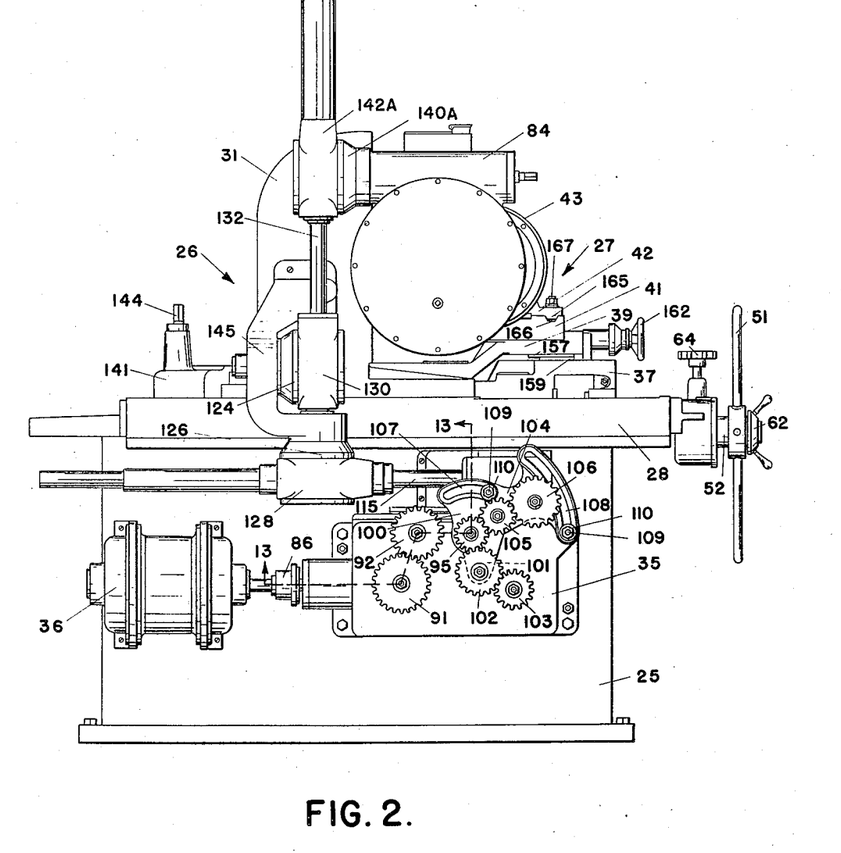
Figure 2 is a side elevation from the left side of the machine.

The setting of the machine as previously described has been for the purpose of grinding the outside cutter blades. The same may be used for grinding inside cutter blades, but in this instance it is necessary for the cutter spindle to be adjusted to different angles. In general, the cutter spindle is adjusted in a horizontal plane so that the inside surface of the cutter blades is inclined with respect to the grinder axis at an angle equal to the pressure angle of the blade. The cutter spindle is also adjusted angularly on the column 31 to obtain the desired angular relationship in a vertical plane. This requires that the cutter spindle be changed from the position as shown in Figure 1 where the dummy head is pointing upwardly to another position where the dummy head is pointing downwardly. As heretofore stated, the angular position of the spindle axis and the swinging movement of the swivel are more fully explained in my co-pending application.

There is another adjustment on the machine which is important for securing great accuracy in the pressure angle of the cutter blades ground by this machine. If it is found that the pressure angle varies slightly from that desired, the correction may be made by means of the clutch 196. The clamping nut 197 is loosened and the clutch 196 is angularly adjusted with respect to the clutch teeth 195 on the cooperating member. This slightly changes the timing between the rotation of the dummy head and the swinging of the swivel and has the effect on a given section of the cutter blade to correspondingly change the pressure angle. Since the teeth of the clutch are very fine, the adjustment of the clutch to the next adjacent tooth gives a very minute change in pressure angle, and it will readily be seen therefore that any desired pressure angle may be obtained by this adjustment.

The adjustments and movements on this machine are sufficient to manufacture a blade as disclosed in my co-pending application Serial No. 67,541, filed on even date herewith. The machine may also be used to make angular corrections or to alter shapes of conical or cylindrical surfaces by means of the angular adjustment of the work spindle in relation to the grinding wheel. For example, the machine is capable of manufacturing gear cutter blades of the type disclosed in the patent to Gstyr, No. 1,969,841. In this patent the blade is off-set in a dummy head to grind a conical surface which, when placed radial in its cutting head, will have the necessary side clearance. However, certain slight inaccuracies occur when the blade is tipped to this cutting position, one of which is a slight change in pressure angle from front to back, due to the fact that it is ground having characteristics of one cone and used having characteristics of different cones as it is sharpened from front to back. With my machine, utilizing the pivotal motion as described, the blades disclosed in the Gstyr patent can be made to have a constant pressure angle from front to back. Because of this correction, the blade is no longer a true conical surface but is a warped conical surface.

From the above it will be seen that my invention includes a novel machine which may be used for other purposes than those specifically heretofore described. Also, my invention includes a general method of making corrections in cutter blades and other conical, cylindrical or other curved surfaces.

What I claim as my invention is:

1. A grinding machine comprising a frame, a work spindle adjustably mounted on said frame to be angularly positioned in both vertical and horizontal planes, a swivel on said frame, a rotating grinder wheel on said swivel, means for rotating said work spindle in any angular position of adjustment, and means for oscillating said swivel a plurality of times during one continuous rotation of said work spindle in timed relation to and simultaneously with the rotation of said work spindle.

2. A grinding machine comprising a frame, a work spindle adjustably mounted on said frame to be angularly positioned in both vertical and horizontal planes, a grinder wheel spindle pivotally mounted on said frame, means for rotating said work spindle in both vertical and horizontal positions of adjustment, means for simultaneously oscillating said grinder wheel spindle about said pivot in such timed relation with the rotation of said work spindle that there are a plurality of oscillations during one continuous revolution of the work spindle and means for advancing or retarding the oscillation of said grinder spindle with respect to the rotation of said work spindle to change the angular relationship of the work spindle and the grinder spindle at a given point in the cycle.

3. A machine for grinding gear cutter blades comprising a rotatable grinding head, means for continuously rotating said grinding head, a rotatable grinder wheel, means on said head for securing a plurality of blades circumferentially arranged, means for angularly positioning said grinding head in relation to said grinder wheel in both horizontal and vertical planes, means for axially adjusting said grinding head and means for oscillating said grinder wheel about an axis in timed relation to and simultaneously with the rotation of said grinding head so that the oscillating movement is the same for each blade, and means for varying the amplitude of said oscillation.

4. A machine for grinding face mill gear cutter blades comprising a frame, a swivel pivotally mounted on said frame to swing about a vertical axis, a grinder wheel mounted on said swivel, means for adjusting said grinder wheel to bring the surface of the wheel on said pivotal axis, a grinding head mounted on said frame, means on said head for securing a plurality of blades circumferentially spaced, means for angularly adjusting said head in horizontal and vertical planes with respect to said grinder wheel, means for axially adjusting said head, means for imparting a relative movement between said head and said grinder wheel to bring said blades in predetermined relation with said pivotal axis, means for continuously rotating said grinding head and means for oscillating said swivel simultaneously with and in such timed relation to the rotation of said head as to give a sequence of complete oscillations for each revolution of the grinding head.

5. The method of manufacturing cutter blades which comprises placing the cutter blade in a dummy head in a plane parallel to the axis of said head and inclined in said plane an amount corresponding to the top clearance angle, rotating the head, adjusting the axis of the head with respect to the axis of a cylindrical grinder wheel in such a way that the surface of the grinder wheel contacts with the side of said blade in a line from top to bottom which in a normal plane through the axis of the head is a curved line and in any element of revolution of the normal cutting plane of said blade has its top, bottom and midpoints in a mathematically straight line, and swinging said grinder wheel with respect to the cutting head in timed relation with the rotation of said head, said swinging being about an axis perpendicular to the axis of the grinder wheel which axis passes through the grinding surface and through a point on the side edge of said blade.

6. A machine for grinding gear cutter blades comprising a grinding head adapted to carry said gear cutter blades, a grinder wheel, the axis of said grinding head and the axis of said grinder wheel being at a predetermined angle, a swivel on which said grinding wheel is mounted, a pivot about which said swivel swings, a cam operatively connected to said swivel, means for rotating said grinder wheel, means for continuously rotating said grinding head, means for rotating said cam simultaneously with and in predetermined geared relation to the rotation of said head, means for advancing or retarding the motion of said cam in relation to the rotation of said grinding head to change the relative angular relationship between the grinding head axis and the grinder wheel axis, and relative means of adjustment whereby said cutter blades will contact the grinding surface of said grinder wheel along a line passing through the point of common tangency with the axis of said pivot.

7. A machine for grinding a gear cutter blade comprising a rotatable grinding head, a rotatable grinder wheel, a blade in said head extending in a plane parallel to the axis of rotation of said head and inclined in said plane at an angle to said grinding head axis, said blade being of trapezoidal cross section and having a cutting edge which forms one side of the trapezoid and said section forming elements of revolution from front to back of said blade, means for positioning said grinder wheel axis at an angle to the axis of said grinding head, means for rotating said grinder wheel, means for rotating said grinding head and means for oscillating said grinder wheel about a pivot simultaneously with and in positive time relation to the rotation of said grinding head to produce a blade having a cutting edge, all elements of revolution of which are straight from top to bottom and have a constant angle from front to back.

8. A machine comprising a swivel in a horizontal plane movable about a vertical axis, a grinder wheel on said swivel with its cylindrical surface tangent to a vertical plane through said axis, a grinding head supported at an angle with respect to both horizontal and vertical planes, a side cutting blade in said grinding head and extending in a plane parallel to the axis of said head and inclined in said plane the amount of the top clearance angle, the angular position of said grinding head being in such relation to the vertical axis that the grinder wheel contacts with a side surface of said blade from top to bottom along a line which when measured in any element of the normal cutting plane of said blade will form a cutting edge, the top, middle and bottom of which will lie along a mathematically straight line, means for rotating said spindle, and means for swinging said swivel simultaneously with and in timed relation to said rotation in such a way that the pressure angle of the blade is constant from front to back.

9. The method of manufacturing a gear cutter blade comprising a cutting edge, a surface back of said cutting edge, a non-cutting edge, a surface back of said non-cutting edge, a top edge, a surface back of said top edge, all of said surfaces being surfaces of revolution of said blade, placing said blade in a grinding head in a plane parallel to the axis of said head and inclined in said plane to an angle equal to the top clearance angle of the blade, grinding the top surface as a plane surface, grinding the surface back of the non-cutting edge by standard cylindrical grinding means, and grinding the surface back of said cutting edge by positioning a grinding wheel in contact with said blade, rotating said grinding head, and swinging said grinding wheel in timed relation to the rotation of said grinding head to produce a surface back of said cutting edge, all cutting elements of which when measured in any normal cutting plane of the blade from front to back, are at a constant angle relative to the axis of said surface of revolution.

10. The method of finishing the side surface of a cutter blade for a face mill gear cutter head, said blade having a side cutting edge and a surface back of said cutting edge which is adapted to be sharpened back so that all elements of said side surface may become side cutting edges lying in planes extending through the axis of said cutter head, comprising setting the blade in a grinding head so that the blade is tilted out of parallelism with the head axis to the top relief angle, setting a grinder wheel so that a straight line grinding element thereof contacts with said blade from top to bottom along a predetermined line, rotating said grinder wheel, rotating said grinding head and swinging said grinder wheel about an axis as the blade traverses the wheel from front to back, said swinging being in timed relation to the rotation of said grinding head such that when said blade is in said cutter head all said cutting elements of said blade from front to back will have the same angular inclination to the axis of said cutter head.

11. The method of finishing the side surface of a cutter blade for a face mill gear cutter head, said blade having a side cutting edge and a surface back of said cutting edge which is adapted to be sharpened back so that all elements of said side surface may become side cutting edges lying in planes extending through the axis of said cutter head, comprising setting the blade in a grinding head, setting a grinder wheel so that a straight line grinding element thereof contacts with said blade from top to bottom along a predetermined line, rotating said grinder wheel, rotating said grinding head and swinging said grinder wheel about an axis as the blade traverses the wheel from front to back, said swinging being in timed relation to the rotation of said grinding head such that when said blade is in said cutter head all said cutting elements of said blade from front to back will have the same angular inclination to the axis of said cutter head.

12. A grinding machine comprising a frame, a work spindle adjustably mounted on said frame to be angularly positioned in both vertical and horizontal planes, a swivel on said frame, a rotatable grinder wheel on said swivel, means for rotating said work spindle in both vertical and horizontal positions of adjustment, means for oscillating said swivel about a pivot a plurality of times during one continuous rotation of said work spindle and in timed relation to and simultaneously with the rotation of said work spindle, means for adjusting said grinder wheel relative to said swivel to cause the grinding surface thereof to be positioned tangent to the axis of said swivel pivot.

13. A grinding machine comprising a frame, a table slidably mounted on said frame, a rotatable work spindle adjustably mounted on said table, a carriage on said frame adapted to be moved in a direction perpendicular to the movement of said table, a swivel mounted on said carriage, a pivot about which said swivel oscillates, a rotatable grinder wheel adjustably mounted on said swivel, means for rotating said work spindle, means for oscillating said swivel in timed relation with the rotation of said work spindle, means for adjusting said grinder wheel in predetermined relation with said pivot and means for adjusting said pivot to a predetermined relation with said work spindle, and means for feeding said table to and from said grinder wheel.

14. A machine for grinding gear cutter blades comprising a frame, a work spindle adjustably mounted on said frame to be angularly positioned in both vertical and horizontal planes, a swivel on said frame, a rotatable grinder wheel on said swivel, means for rotating said work spindle in any angular position of adjustment, means for oscillating said swivel a plurality of times during one continuous rotation of said work spindle in timed relation to and simultaneously with the rotation of said work spindle, and means for advancing or retarding the oscillation of said swivel with respect to the rotation of said work spindle.

ERNEST C. HEAD.